United States Patent [19]

Guinn

[11] 4,212,354
[45] Jul. 15, 1980

[54] METHOD FOR INJECTING CARBON DIOXIDE INTO A WELL

[75] Inventor: Jerry H. Guinn, Pampa, Tex.

[73] Assignee: Service Fracturing Company and Airry, Inc., Pampa, Tex.

[21] Appl. No.: 21,441

[22] Filed: Mar. 19, 1979

[51] Int. Cl.² ............... E21B 43/24; E21B 43/26
[52] U.S. Cl. .................... 166/303; 166/75 R; 166/305 R; 166/308
[58] Field of Search ............... 166/57, 75 R, 268, 272, 166/273, 274, 303, 305 R, 307, 308

[56] References Cited
U.S. PATENT DOCUMENTS

| | | | |
|---|---|---|---|
| 3,100,528 | 8/1963 | Plummer et al. | 166/303 |
| 3,108,636 | 10/1963 | Peterson | 166/308 |
| 3,195,634 | 7/1965 | Hill | 166/302 |
| 3,371,715 | 3/1968 | Fly et al. | 166/307 |
| 3,381,523 | 5/1968 | Nettles | 166/305 R X |
| 3,393,741 | 7/1968 | Huitt et al. | 166/308 |
| 3,664,422 | 5/1972 | Bullen | 166/75 R X |
| 3,842,910 | 10/1974 | Zingg et al. | 166/305 R |
| 4,126,181 | 11/1978 | Black | 166/75 R X |

Primary Examiner—Stephen J. Novosad
Assistant Examiner—George A. Suchfield
Attorney, Agent, or Firm—James E. Bradley

[57] ABSTRACT

A method for injecting carbon dioxide into an oil or gas well. The carbon dioxide is transported to the well site in a tank while maintaining it at a temperature and pressure sufficient to retain the carbon dioxide primarily in a liquid state. The liquid carbon dioxide is drawn off and pumped to an intermediate pressure by a booster pump. To avoid flashing in the line due to the pressure drop as the liquid is withdrawn, a feedback loop between the output of the booster pump and the tank is utilized. A vaporizer is located in the feedback loop for vaporizing the carbon dioxide injected back into the tank. The amount injected is controlled to maintain the tank at a sufficient pressure to avoid flashing in the discharge line. After the booster pump, the remainder of the liquid carbon dioxide is pumped to a higher pressure by a high pressure pump. The high pressure liquid is commingled with other high pressure liquids and pumped down the well. The high pressure carbon dioxide can also be vaporized by high pressure vaporizer at the surface and injected into the well as a gas.

8 Claims, 1 Drawing Figure

METHOD FOR INJECTING CARBON DIOXIDE INTO A WELL

BACKGROUND OF THE INVENTION

1. Field of the Invention

This invention relates in general to treating oil and gas wells with carbon dioxide, and in particular to an improved method for injecting the carbon dioxide into a well.

2. Description of the Prior Art

In order to increase production, oil and gas wells may be hydraulically fractured or treated with other chemicals. In the "frac" treatment, a liquid slurry under high pressure is pumped down the well to create cracks in the formation. Glass beads, grains of sand, or the like, in the slurry enter the cracks to prop them open for improved formation flow.

One fluid that has been mixed with the slurry in the past is carbon dioxide. Carbon dioxide has several advantages, such as reducing the swelling of clays, lowering the pH of the treating fluid, and also helping in removing blocks from the formation. Carbon dioxide is also useful in treating the well with other chemicals such as acids. Normally the carbon dioxide is pumped in as a liquid. Once it exceeds its vaporizing temperature at the injection pressure, it begins changing into a vapor state, or gas. Once the carbon dioxide exceeds its critical temperature it becomes a gas. The volume increases dramatically during the change in phase. The carbon dioxide enters the perforations in the formation. The vapor forms a gas lift for lifting the other liquids out of the well after the surface pressure is removed.

One difficulty occurs in obtaining sufficiently high flow rates of carbon dioxide to mix with the frac slurry being pumped down at high rates. Carbon dioxide is brought to the well site in a tank truck. The temperature is about 0° F. (Fahrenheit), and the pressure is around 300 psig (pounds per square inch gage). Under these conditions, the carbon dioxide is in a liquid state, but for a small vapor blanket at the top of the tank. The liquid is drawn off to a booster pump which pumps the liquid to a level about 50 to 125 psig above the tank pressure. The purpose of the booster pump is to reliquefy partially vaporized carbon dioxide that vaporises in the discharge line due to the pressure drop. However, as the tank pressure drops due to withdrawal, more and more of the liquid vaporizes in the line. The vapor blanket increases in size, but the liquid in the tank does not vaporize sufficiently fast to maintain tank pressure. The very fast vaporization in the line, known as "flashing" absorbs the latent heat of vaporization, thus lowering the temperature drastically. The temperature may drop below the freezing point of carbon dioxide, freezing the liquid carbon dioxide and blocking the line. Also a large amount of vapor may cause the booster pump to vapor lock. Consequently, only small flow rates of carbon dioxide can be achieved.

The pumping of the liquid slurry during a frac treatment cannot be stopped until the fracturing is completed. Otherwise, the well will "sand up" due to the large amount of sand in the slurry enroute to the perforations. Consequently, if the carbon dioxide booster pump vapor locks, or if the line to the booster pump freezes, the carbon dioxide will have to be deleted from the rest of the treatment.

Also, there are certain instances in which pumping of vaporized carbon dioxide from the surface would be useful, such as in low temperature wells. However, because of the low flow rates available from liquid carbon dioxide transport tanks, sufficiently high flow rates for treatment with carbon dioxide vapor are not available.

SUMMARY OF THE INVENTION

It is accordingly a general object of this invention to provide an improved method for injecting carbon dioxide into a well.

It is a further object of this invention to provide an improved method for injecting carbon dioxide into a well in which higher flow rates are attainable for the carbon dioxide than previously.

It is a further object to provide an improved method for injecting carbon dioxide into a well in which high flow rates are attainable either under liquid or vapor injection.

In accordance with these objects, a method is provided wherein the pressure of the tank is maintained during withdrawal at a sufficient level to avoid flashing between the tank and the booster pump. To perform this pressure maintenance, a feedback loop is provided between the output of the booster pump and the top of the tank. A vaporizer is placed in the feedback line. A portion of the liquid carbon dioxide is diverted through the vaporizer, where it is vaporized and then fed back into the vapor blanket of the tank. The feedback is monitored so as to maintain the tank at the same pressure as it had when full, thus avoiding flashing.

The remainder of the liquid carbon dioxide after the booster pump proceeds to a high pressure pump. It is then commingled with the frac liquid slurry and pumped down the well. In the alternative, a high pressure vaporizer is located after the high pressure pump for supplying high pressure vaporized carbon dioxide if desired.

BRIEF DESCRIPTION OF THE DRAWINGS

The FIGURE is a schematic representation of the method of this invention.

DESCRIPTION OF THE PREFERRED EMBODIMENT

Figure 1:
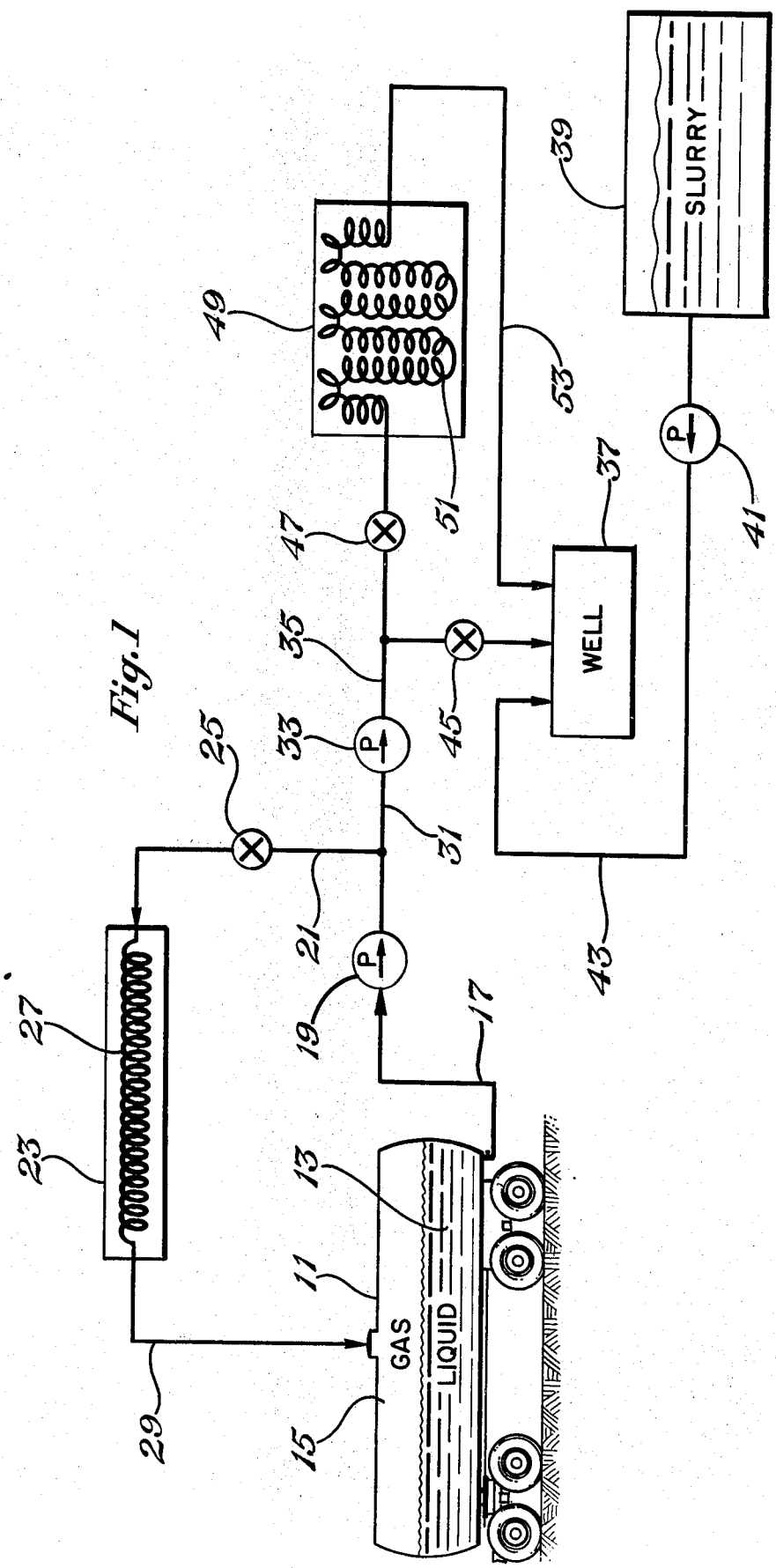

Referring to the FIGURE, carbon dioxide is brought to the well site in a tank 11 mounted on wheels and towed by a truck (not shown). The carbon dioxide has been loaded into the tank at the manufacturing plant in a normal manner to preserve most of it in a liquid state, as indicated by 13. A vapor blanket, equal to about five percent of the volume of the tank, is purposely left in the tank to avoid explosive conditions, as is known in the art. The tank is normally insulated and capable of withstanding pressure up to about 500 psig. The capacity is normally about 50 to 120 barrels, and often several of these tanks will be placed in parallel at a well site to deliver large quantities of carbon dioxide. Normally the tank will be transported to the well site with an internal pressure of about 250 to 350 psig and a liquid carbon dioxide temperature of minus 10° to 0° F.

At the well site, a line 17 from the discharge port at the lower rear of the tank 11 is connected to a booster pump 19. Pump 19 is normally a centrifugal pump capable of pumping the liquid to a pressure of about 50 to 125 psig above the pressure in the line 17. At the discharge of booster pump 19, a line 21 is connected to a vaporizer 23. A manual flow control valve 25 is located in line 21.

Vaporizer 23 is of conventional construction and may be of many types. In the preferred embodiment, it comprises a tank containing water and ethylene glycol maintained at a temperature of about 212° F. by a heater (not shown). A coil 27 passes through the tank. The liquid carbon dioxide is forced through the coil 27 by the booster pump 19, the heat from the liquid in the vaporizer 23 tank causing the carbon dioxide to vaporize. A line 29 extends from the discharge of vaporizer 23 to the top of transport tank 11 for discharging the vaporized carbon dioxide into the vapor blanket 15.

At the discharge of booster pump 19, a second line 31 joins line 21 and extends from the booster pump 19 to a high pressure pump 33. High prssure pump 33 is a positive displacement pump capable of delivering high pressure and volume. Typical pressures will be 2,000 to 10,000 psig and flow rates up to 20 barrels per minute are desired. The discharge of high pressure pump 33 is connected to a line 35 leading to the well, indicated as 37. The frac slurry, or treating liquid for other treatments, is pumped from a tank 39 by a high pressure pump 41 through line 43 to the well 37. The liquid carbon dioxide commingles with the liquid slurry as the liquids are pumped down the well.

In operation, the liquid carbon dioxide 13 is withdrawn from the tank 11 through line 17. Booster pump 19 increases the pressure of the liquid, passing the majority of the liquid onto the high pressure pump 33. Valve 25 is opened to allow liquid carbon dioxide into the feedback loop consisting of line 21, vaporizer 23 and line 29. The liquified carbon dioxide is vaporized in vaporizer 23 and pumped into the vapor blanket 15 in tank 11. Valve 25 is manually controlled so as to maintain the tank 11 at the pressure that it originally had during transport. The pressure should be substantially constant, and preferably not allowed to drop below about 250 psig. This creates a higher pressure in line 17, avoiding flashing of the liquid to a vapor in the line. Vapor blanket 15 increases in size as the liquid 13 is withdrawn due to the injection of the vaporized carbon dioxide from vaporizer 23. Normally about one to six percent of the flow from the booster pump will be fed back to the vaporizer 23. Control valve 25 will be monitored to prevent the pressure in the vaporizer 23 from exceeding the tank pressure by a substantial amount. Preferably, the vaporizer pressure 23 is about 300 psig, and in any case must exceed the pressure in the tank 11. After all of the liquid 13 is withdrawn from the tank 11, the tank valve between it and the booster pump 19 is closed, leaving the vaporized carbon dioxide in the tank to avoid corrosion before the next filling.

The remainder of the liquified carbon dioxide, after the booster pump 19, proceeds through line 31 to the high pressure pump 33. The booster pump 19 increases the pressure to an intermediate level, substantially less than the output of the high pressure pump 33. High pressure pump 33 further increases the pressure of the liquified carbon dioxide, to a range between 2,000 and 10,000 psig. This high pressure liquid carbon dioxide is commingled with the frac slurry from pump 41, both proceeding down the well at the same time. Frac fluid will be pumped down at various rates from about 20 to 100 barrels per minute. Once downhole, the temperature of the well 37 heats the liquid carbon dioxide. As the vaporizing temperature, and particularly the critical temperature, is passed, the carbon dioxide changes into a vapor and expands into the formation. Once pressure is removed at the surface by stopping pumps 33 and 41, the vapor serves to lift the slurry from the well to clear it for production.

The feedback loop completely avoids flashing and freezing in the line, thus making the withdrawal rate depend only on the size of the discharge port in the tank. Previously, regardless of the discharge port size, only three to four barrels per minute was attainable, whereas now ten to twenty barrels per minute are possible.

Typical frac treatments last about 45 minutes to one hour of high pressure pumping time. On large scale jobs, the pumping time may be several hours. The temperatures and pressures at which carbon dioxide undergoes changes in phase of liquid, solid and gas are well known and published in many texts, such as "Handbook of Chemistry and Physics", 43 Ed., 1961, on pages 2500 and 2501. This material is incorporated by reference.

FIG. 1 also discloses an apparatus for an alternate method of using carbon dioxide. Rather than pumping the liquid carbon dioxide down the well, it is desirable to use high pressure vaporized carbon dioxide under certain circumstances. This is particularly useful in shallow wells where the bottom hole temperature may be insufficient to vaporize the carbon dioxide. Although the critical temperature of carbon dioxide is 87.8° F., generally about 100° F. bottom hole temperature is required to vaporize the carbon dioxide properly.

In order to pump high pressure vaporized carbon dioxide down the well, a valve 45 is positioned in the line 35 leading to the well. Line 35 has a connection that leads to another valve 47 and to a high pressure vaporizer 49. Valve 47 selectively closes and opens line 35 to the high pressure vaporizer 49. Valve 45 selectively opens and closes the line from the high pressure pump 33 and to the well 37. The high pressure vaporizer 49 is capable of withstanding much higher pressure than the low pressure vaporizer 23, for example up to approximately 10,000 psig. High pressure vaporizer 49 contains a coil 51 for containing the carbon dioxide liquid. A flame burner (not shown), located below, heats the coil 51 directly for heating and vaporizing the carbon dioxide in the coil. The discharge of vaporizer 51 may be connected to the well 37 by a line 53, or to other oil field equipment.

The vaporized carbon dioxide discharging from the high pressure vaporizer 51 is normally pumped down the well along with the frac slurry or an acid in liquid form. The vaporized carbon dioxide performs similar to the liquid carbon dioxide in extending into the perforations, and providing a gas lift to force the liquid from the well once pressure is removed.

It should be apparent that an invention having significant advantages has been provided. The method using the feedback loop and vaporizer maintains pressure in the transport tank, avoiding flashing in the line and allowing higher flow rates. The carbon dioxide can be pumped into the well at higher rates as a liquid or vaporized and pumped in as a vapor.

While the invention has been shown in only two of its forms, it should be apparent to those skilled in the art that it is not so limited but is susceptible to various changes and modifications without departing from the spirit thereof.

I claim:

1. In a method of injecting carbon dioxide into a well having the steps of transporting carbon dioxide to the well site inside a tank, maintaining the temperature and pressure during transporting so as to maintain the carbon dioxide predominately in a liquid state, withdrawing the carbon dioxide and boosting the pressure with a booster pump, then pumping the carbon dioxide down the well with a high pressure pump, an improved method for reducing the vaporization of the carbon dioxide between the tank and the booster pump, comprising:

diverting a portion of the liquid carbon dioxide after the booster pump and before the high pressure pump into a vaporizer;

vaporizing the carbon dioxide in the vaporizer;

transmitting the vaporized carbon dioxide from the vaporizer back into the tank; and controlling the amount of carbon doixide diverted to the vaporizer so as to maintain the tank at a pressure sufficient to avoid vaporization between the tank and booster pump.

2. The method according to claim 1 wherein the tank pressure is maintained substantially at the tranporting pressure by controlling the amount of vaporized carbon dioxide being injected into it.

3. The method according to claim 1 wherein approximately one to six percent of the liquid carbon dioxide after the booster pump is diverted into the vaporizer.

4. The method according to claim 1 further including the steps of commingling the carbon dioxide fluid after the high pressure pump with a treating liquid for well treatment, and pumping both the carbon dioxide fluid and the treating liquid down the well.

5. A method of injecting carbon dioxide into a well with a treating liquid for well treatment comprising;

transporting the carbon dioxide to the well in a tank;

maintaining the temperature and pressure during transport at levels that maintain predominately all of the carbon dioxide in the liquid state, except for a carbon dioxide vapor blanket existing above the liquid carbon dioxide during transporting that is substantially smaller in volume than the liquid portion;

withdrawing the liquid carbon dioxide from the tank and boosting the pressure of the liquid being withdrawn with a booster pump;

mounting a vaporizer with an inlet in communication with the outlet of the booster pump, and an outlet extending to the top of the tank;

diverting a portion of the liquid carbon dioxide immediately after the booster pump to the vaporizer;

vaporizing the incoming liquid carbon dioxide in the vaporizer while maintaining a discharge pressure at least equal to the tank pressure, and transmitting the vaporized carbon dioxide to the vapor blanket to enlarge the vapor blanket as the liquid is withdrawn;

controlling the flow of liquid carbon dioxide to the vaporizer and controlling the vaporizer so as to maintain the tank substantially at the same pressure that it had during transport to the site;

pumping the remainder of the liquid carbon dioxide after the booster pump to a higher pressure by a high pressure pump; and commingling the high pressure liquid carbon dioxide with the treating liquid, and directing the commingled treating liquid and liquid carbon doixide down the well.

6. The method according to claim 5 wherein the carbon dioxide is vaporized in the vaporizer by heating the liquid carbon dioxide being transmitted to it.

7. The method according to claim 5 wherein the booster pump increases the pressure of the carbon dioxide to an intermediate pressure that is substantially less the pressure of the high pressure pump.

8. A method of injecting vaporized carbon dioxide into a well, comprising:

transporting the carbon dioxide to the well in a tank while maintaining the temperature and pressure in the tank at levels that retain most of the carbon dioxide in the liquid state, a vaporized blanket of carbon dioxide existing above the liquid carbon dioxide during transport that is substantially smaller in volume than the volume of the liquid carbon dioxide;

withdrawing the liquid carbon dioxide from the tank and boosting the pressure of the liquid being withdrawn with a booster pump;

mounting a low pressure vaporizer with an inlet in communication with the outlet of the booster pump, and an outlet to the top of the tank;

diverting a small portion of the liquid carbon dioxide immediately after the booster pump to the low pressure vaporizer;

vaporizing the incoming liquid carbon dioxide in the low pressure vaporizer while maintaining a discharge pressure at the low pressure vaporizer at least equal to the tank pressure, then transmitting the vaporized carbon dioxide to the vapor blanket to enlarge the vapor blanket as the liquid carbon dioxide is withdrawn;

controlling the flow of liquid carbon dioxide to the low pressure vaporizer and controlling the low pressure vaporizer so as to maintain the tank at a pressure sufficient to avoid vaporization of the carbon dioxide from the tank to the booster pump;

pumping the remainder of the liquid carbon dioxide immediately after the booster pump to a higher pressure by a high pressure pump;

vaporizing the high pressure liquid carbon dioxide after the high pressure pump by heating the liquid carbon dioxide in a high pressure vaporizer;

then transmitting the high pressure vaporized carbon dioxide into the well.

* * * * *